(No Model.) 7 Sheets—Sheet 1.

E. B. MEATYARD.
APPARATUS FOR COMPRESSING FLUID METAL.

No. 347,004. Patented Aug. 10, 1886.

Fig 1

Witnesses
W. C. Coolies
A. M. Best

Inventor
Edward B Meatyard
By Coburn & Thacher
Attorneys (No Model.)

E. B. MEATYARD.
APPARATUS FOR COMPRESSING FLUID METAL.

No. 347,004. Patented Aug. 10, 1886.

Witnesses

Inventor
Edward B Meatyard
By Coburn & Thacher
Attorneys (No Model.) 7 Sheets—Sheet 6.

E. B. MEATYARD.
APPARATUS FOR COMPRESSING FLUID METAL.

No. 347,004. Patented Aug. 10, 1886.

Witnesses
W. C. Corlies
A. M. Best.

Inventor
Edward B. Meatyard
By Coburn & Thacher
Attorneys

(No Model.) 7 Sheets—Sheet 7.

E. B. MEATYARD.
APPARATUS FOR COMPRESSING FLUID METAL.

No. 347,004. Patented Aug. 10, 1886.

Witnesses
W. C. Corlies
A. M. Beat

Inventor
Edward B. Meatyard
By Coburn & Thacher
Attorneys

United States Patent Office.

EDWARD B. MEATYARD, OF LAKE GENEVA, WISCONSIN.

APPARATUS FOR COMPRESSING FLUID METAL.

SPECIFICATION forming part of Letters Patent No. 347,004, dated August 10, 1886.

Application filed August 1, 1885. Serial No. 173,285. (No model.)

*To all whom it may concern:*

Be it known that I, EDWARD B. MEATYARD, a citizen of the United States, and residing at Lake Geneva, in the county of Walworth and State of Wisconsin, have invented certain new and useful Improvements in Apparatus for Compressing Fluid Metal, which are fully set forth in the following specification, reference being had to the accompanying drawings, in which—

Like letters refer to like parts in all the figures of the drawings.

My invention relates to apparatus for producing dense and homogeneous steel ingots, it being in the nature of an improvement upon the apparatus set forth in an application for Letters Patent filed by me September 10, 1884, Serial No. 142,701.

The object of my invention is to provide means for filling ingot-molds promptly through gates close to the center of each set of molds; for allowing the expansion of the molds so that they will not rupture the clamping-bolts; for the provision of adequate vents laterally through the outer ends of the branch molds and through the plunger of the central mold, and for the ready renewal of the exposed parts of the plunger.

I will now proceed to describe a construction in which my invention is practically carried out in one form, and will then specifically point out in the claims those features which I believe to be new and wish to protect by Letters Patent.

Figure 5:
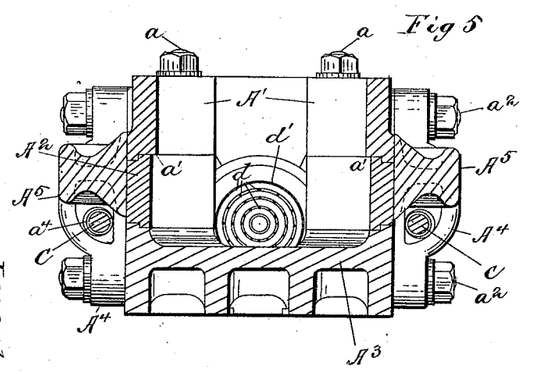
Fig. 5, a transverse vertical section of the same on the line 5 5 of Fig. 2.

In the drawings, A represents a central mold, and B branch molds communicating therewith, these molds being arranged substantially as set forth in my other application hereinbefore specified. The central mold is constructed in three sections—an upper section, A', a middle section, $A^2$, and a lower section, $A^3$—the three sections being connected by stepped or rabbeted joints, as shown in Fig. 5 of the drawings, and being secured together by suitable bolts, $a$, passing vertically through all three sections. The upper section, A', is narrower transversely as to its internal diameter than the other two sections, forming an overhang, as shown at $a$ in Fig. 5 of the drawings.

Figure 6:
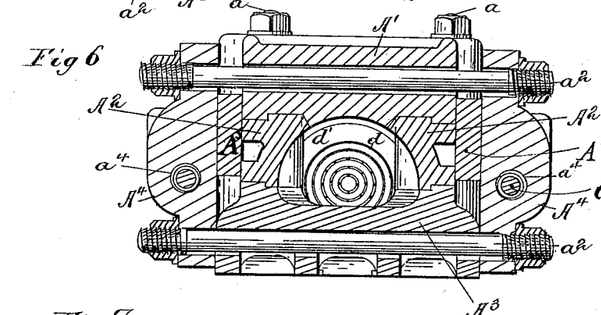
Fig. 6, a similar section on the line 6 6 of Fig. 2.
Figure 7:
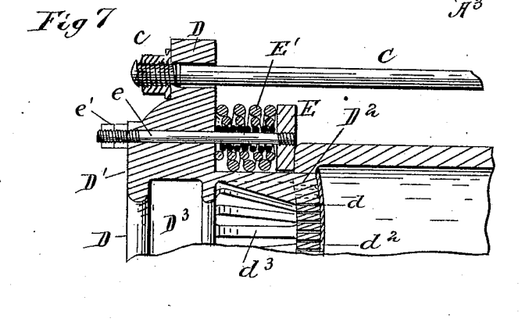
Fig. 7, an enlarged detail view of a portion of Fig. 3.

In order to further strengthen the central mold against the great bursting strain to which it is in practice submitted, I employ upon each side thereof, at or near each end, a vertical tie-piece, $A^4$, these tie-pieces being connected in pairs at each end by means of suitable through-bolts, $a^2$, passing through the upper and lower ends of each tie-piece and through the upper and lower sections of the mold, substantially as shown in Fig. 6 of the drawings. The mold is further braced and strengthened by means of a horizontal tie-piece, $A^5$, on each side of the mold, the ends of the said tie-piece passing between the vertical tie-pieces $A^4$ at each end of the mold and the wall of the mold proper, and being thereby clamped in position against the mold. By means of this system of bolts and tie-pieces the mold is enabled to withstand the severe vertical and transverse strains to which it is subjected while in use.

The side molds or branch molds, B, are arranged at each end of the central mold, A, and on a somewhat lower level, a passage, $a^3$, leading from the central mold to each branch mold, the bottom of this passage being on a level with the bottom of the central mold, as clearly shown in Figs. 3, 4, 5, and 6 of the drawings. These branch molds are held in position against the central mold by means of through clamping-bolts C, connecting the caps D at the outer ends of the two molds, the bolts being braced and supported by passing through apertures $a^4$ in the upright tie-pieces $A^4$.

Each cap D is composed of a head portion, D′, and a body portion, $D^2$, which latter enters an opening of corresponding dimensions in the outer end of the branch mold to which it is attached. This body portion $D^2$ forms a plunger, which, as the mold expands longitudinally by reason of the heat which it absorbs from the metal which it contains, will gradually advance to a slight extent into the interior of the mold as the length of the latter increases, the cap being held stationary by means of the bolts C, in an obvious manner. In order to allow for this expansion of the mold, I arrange springs between the outer end of the mold and the head portion D′ of the cap, this result being obtained in the construction shown by means of a cross-head, E, surrounding the body portion D of the cap, and bearing against the end of the mold, being held against the same by means of a spring or springs, E′, interposed between the said cross-head and the inner face of the head D′ of the cap D. The cross-head E is preferably provided with guide-rods $e$, secured to the cross-head and passing through the cap D, being provided with nuts $e'$ on their threaded outer ends to limit the inward motion of the cross-head under the action of the spring. By varying the position of the nuts $e'$ upon the guide-rods $e$, the extreme distance to which the cross-head E may be thrust from the head portion D′ of the cap D by means of the springs E′ will be varied, so that the tension of the springs when in their normal position may be correspondingly varied. Thus by means of the proper adjustment of the nuts $e'$, and a corresponding adjustment of the ends $c$ of the bolt C, the degree of pressure which the springs E′ exert to hold the branch molds against the central mold may be regulated, as desired, within certain limits. The spring E′ is shown in the present instance as composed of three spiral springs coiled around the guide-rods $e$, which latter prevent any lateral deflection in the springs when they are compressed. By this means, it will be seen that when the mold expands its outer end will move upon the body portion $D^2$ of the cap, bearing against the cross-head E, and carrying it and the guide-rods $e$ outward, thereby compressing the springs E′, which maintain a sufficient pressure to hold the inner end of the mold against the central mold to prevent any separation of the two at their point of junction. Of course when a single branch mold is employed the other end of the bolts C will be attached to the central mold instead of to the cap of the other branch mold.

In order to provide an adequate vent for the escape of the gases contained in the molten metal in the branch molds in addition to the vent provided through the central mold and plunger, as hereinafter described, a recess, $D^3$, is formed in the cap D, extending almost to the face of the body portion $D^2$ of the cap, and a series of minute apertures, $d$, are formed in the said face, communicating with the recess $D^3$. A series of grooves, $d'$, are formed in the face of the portion $D^2$, these grooves being preferably arranged in concentric circles, as shown in Figs. 5 and 6 of the drawings, the passages $d$ terminating in these grooves, and the whole face being covered with a facing of asbestus cloth, $d^2$, or other suitable porous refractory material. The gases contained in the molten metal will pass through the asbestus-cloth facing into the grooves $d'$, and thence through the passages $d$ into the recess $D^3$, and so out into the open air. The recess $D^3$ may, if desired, be filled with ground silicon or other porous refractory material, but such filling may be dispensed with. A series of strengthening-flanges, $d^3$, is shown in the drawings to brace the inner end of the body portion $D^2$ against the pressure of the metal in the mold.

Figure 8:
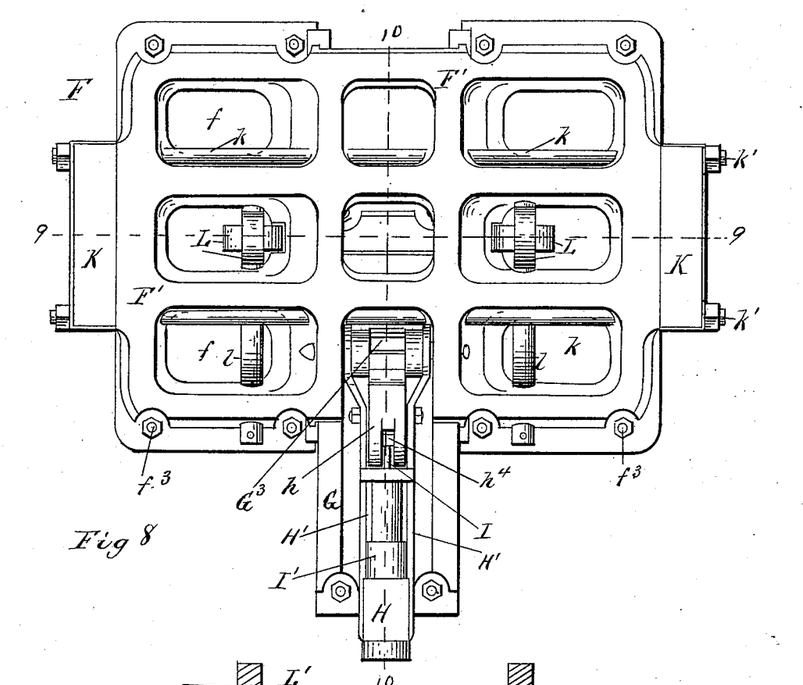
Fig. 8, a plan view of the plunger detached, and on an enlarged scale.
Figure 9:
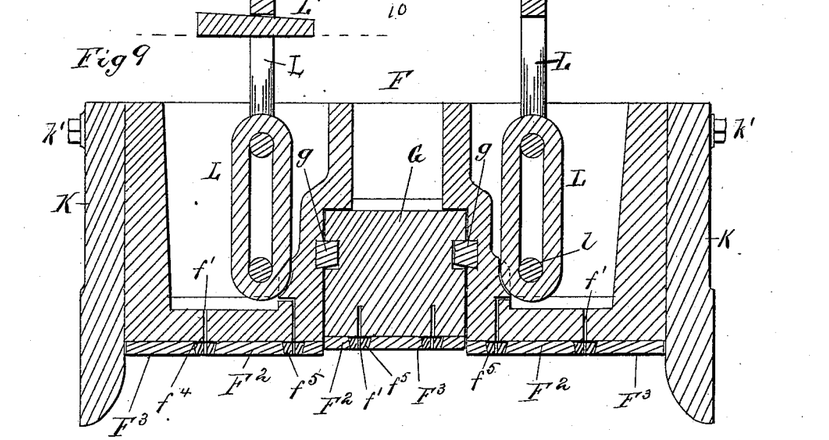
Fig. 9, a vertical section on the line 9 9 of Fig. 8.
Figure 10:
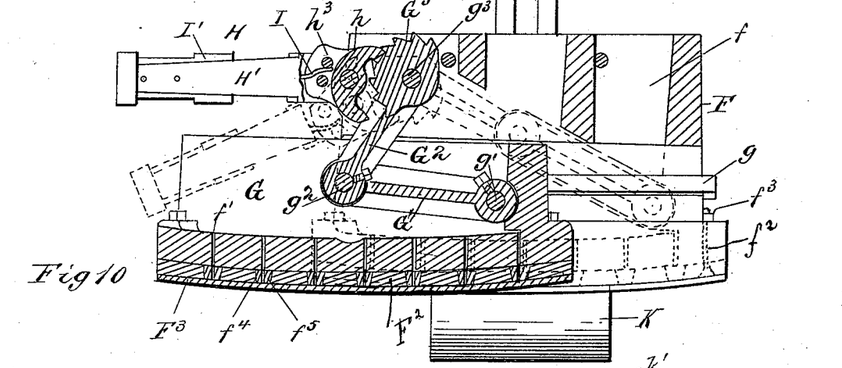
Fig. 10, a vertical section on the line 10 10 of Fig. 8.
Figures 11, 12:
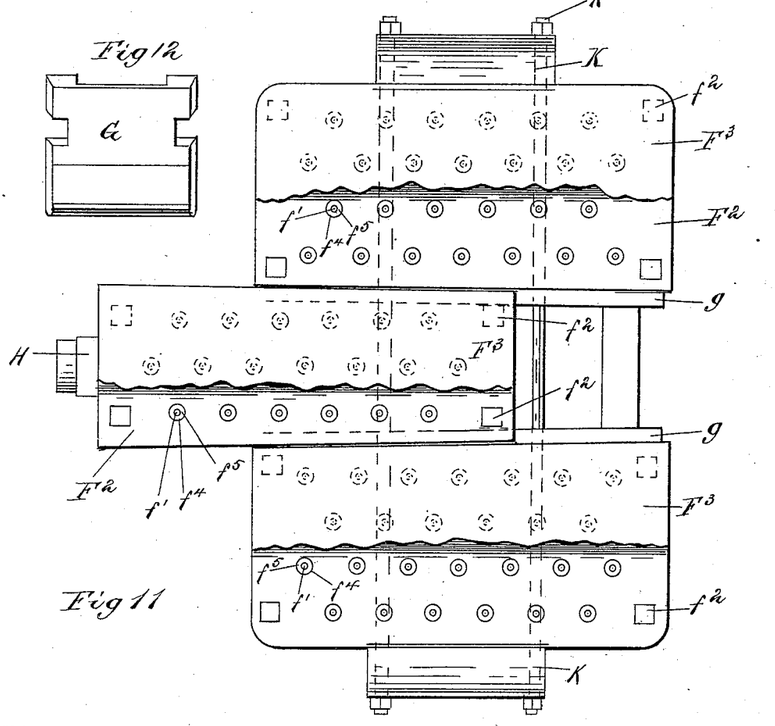
Fig. 11, a bottom plan view of the plunger.
Fig. 12, an end elevation of the movable section of the plunger.

The plunger F, which is used in conjunction with the molds hereinbefore described and with a suitable press to compress the metal in the molds, is of a length corresponding to the length of the recess in the central mold, and of a width corresponding to the width of the opening in the upper portion, A′, of the said mold. The body of the plunger consists of a strong metallic frame-work, F′, constructed substantially as shown in detail in Figs. 8, 9, and 10 of the drawings. A series of recesses, $f$, are formed in the body of the plunger, any suitable number of recesses being employed, whereby the said body is made as hollow as is consistent with the strength required. These recesses, in addition to the lightening of the mass of the body of the plunger which they effect, also form a means for the escape of the gas contained in the molten metal during the operation of pressing, minute vent-passages $f'$ leading from these recesses to the face of the plunger. As the face of the plunger, being in contact with the molten metal in the mold, will naturally superheat very rapidly and render the plunger useless, I provide a false bottom or face, $F^2$, which is attached to the plunger proper by means of bolts $f^2$, having enlarged heads countersunk in the lower face of the false bottom and passing up through projecting flanges on the edges of the plunger, above which they receive the nuts $f^3$, by means of which they secure the false bottom firmly in position. The plates which form the false bottom being constructed of cast-iron in order to withstand the heat and pressure to which they are subjected, minute vent-passages can only be bored through them at a great expense of time and labor, and at the same time the metal is liable to chill around these vent-passages, and thereby prevent the passage of the gas through them. In order to overcome these difficulties, I cast the plates which form the false bottom with a number of coned holes or perforations, $f^4$, of considerably larger diameter than the vent-passages $f'$, the smaller end of the cone being toward the working-face of the plunger, and I fill these holes with plugs or bushings $f^5$, of fire-clay or other refractory material, through which a minute vent-passage is formed communicating with the passage $f'$. These fire-clay bushings can be readily made and baked for a small fraction of the expense attendant upon the drilling of minute holes of a suitable diameter through the plates which compose the false bottom, and, being of a refractory nature, will keep the metal from chilling around the vent-holes. The whole bottom face of this false bottom is covered with a facing, $F^3$, of asbestus cloth or other similar porous refractory material, as in my application hereinbefore mentioned, to prevent the metal from chilling against the face of the plunger.

In order to provide means for rapidly pouring the molten metal into the mold without necessitating the removal of the plunger, I provide the said plunger with a movable section, G, shown in the present instance as forming the lower portion of the central part of the body of the plunger. This movable section is formed with a recess in its upper portion and is provided with vent-apertures, a false bottom, and an asbestus facing, as in the case of the remaining portion of the plunger, and slides upon suitable ways, $g$, attached to the body of the plunger. In order to readily move this movable section in or out, I employ the mechanism shown in detail in Figs. 14 to 19, inclusive. A link, G', pivoted to the movable section at $g'$, and constructed, substantially as shown in detail in Fig. 18 of the drawings, has its free end pivoted at $g^2$ to the lower end of a lever, $G^2$, which is itself pivoted at its upper end at $g^3$ to the body portion of the plunger. Upon this upper end of the lever $G^2$ is formed a head provided with two sets of ratchet-teeth, $G^3$, the teeth of one set being reversely arranged with regard to those of the other set. Upon the pivot-bolt $g^3$, which supports the lever $G^2$, is pivoted a hand-lever, H, provided with a spring-pawl, $h$, adapted to engage the ratchet-teeth $G^3$ to rotate the lever $G^2$ upon its pivot-bolt $g^3$, thereby actuating the movable section G of the plunger through the link G' in an obvious manner, to cause it to move in the desired direction upon the ways $g$. The pawl $h$ is supported upon a pivot-bolt, $h'$, between the pieces H', which form the sides of the hand-lever H, and is a double pawl, being provided with two teeth, $h^2$, arranged one on each side to engage the respective ratchets $G^3$ on the opposite sides of the head of the lever $G^2$.

I indicates a spring, the outer end of which is mounted in a block, $i$, attached to or forming part of a sleeve, I', which is mounted between the side pieces, H', of the hand-lever H, and is capable of axial rotation. The inner end of the spring I is arranged between two outwardly-projecting flanges, $h^3$, of the pawl $h$, and bears against one or the other of two pins, $h^4$, passing through the two flanges. It will be seen that when the sleeve I' and spring I are in the position shown in Fig. 14 of the drawings, the spring I will bear against the lower pin, $h^4$, and the lower tooth, $h^2$, of the pawl will engage with the lower set of ratchet-teeth, $G^3$. It will also be seen that by giving the sleeve and spring a half-rotation the spring will then bear against the upper pin, $h^4$, and the upper tooth of the pawl will engage with the upper set of ratchet-teeth on the lever $G^2$. By means of this construction a vertical vibratory movement of the hand-lever H upon its pivot $g^3$ will cause the lever $g^2$ to be operated in either direction, according to the position which has been given to the spring I and pawl $h$, and when desired this motion may be reversed by a simple reversing of the position of the pawl and spring.

Figures 13, 14, 15, 16, 17, 18, 19:
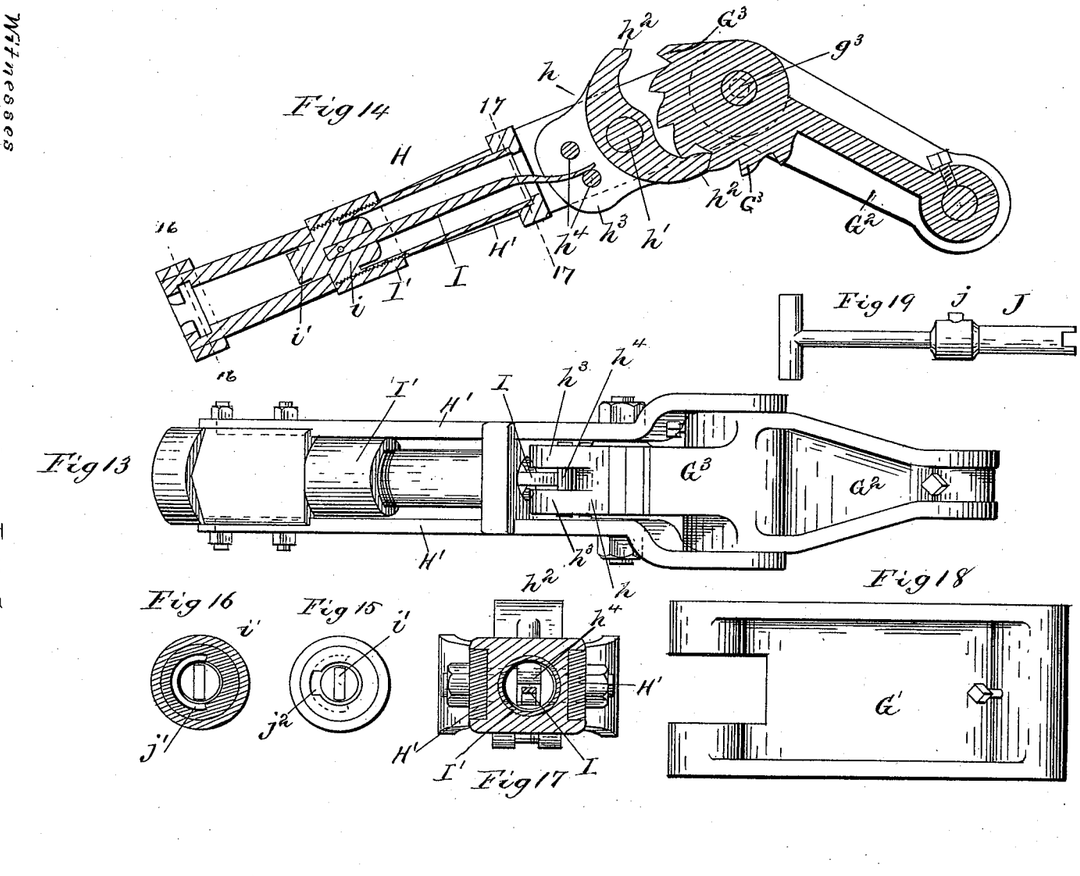
Fig. 13, a plan view of the mechanism for operating the movable section of the plunger.
Fig. 14, a central vertical longitudinal section of the same.
Fig. 15, an elevation of the outer end of the same.
Fig. 16, a transverse section on the line 16 16 of Fig. 14.
Fig. 17, a transverse section on the line 17 17 of Fig. 14.
Fig. 18, a plan view of the connecting-link between the movable section of the plunger and its operative mechanism.
Fig. 19, a detail plan view of the wrench.

In order to facilitate the rotation of the sleeve I', I form upon the outer end of the block $i$ a wrench head or grasp, $i'$, which is located, as shown in Fig. 14 of the drawings, some distance within the hollow outer end of the hand-lever H, and I employ a wrench, J, constructed substantially as shown in Fig. 19 of the drawings, being provided with a socket to fit upon the head $i$, and with a pin, $j$, projecting laterally therefrom and working, when the wrench is in operative position, in a groove, $j'$, formed in the interior wall of the outer end of the wrench and extending preferably half way around this inner wall, so that the ends of the said groove may limit the motion of the wrench to half a turn, which is all that is necessary to reverse the position of the pawl. A longitudinal groove or slot, $j^2$, allows the projecting pin $j$ to enter the groove $j'$ while the wrench is being inserted in position. It will be observed that the body of the movable section G of the plunger tapers from one extremity to the other, both vertically and transversely, the recesses in the plunger in which it fits being similarly tapered, in order to prevent the movable section from sticking, it being so constructed that it is only in contact with the surrounding portions when finally in position.

Figure 1:
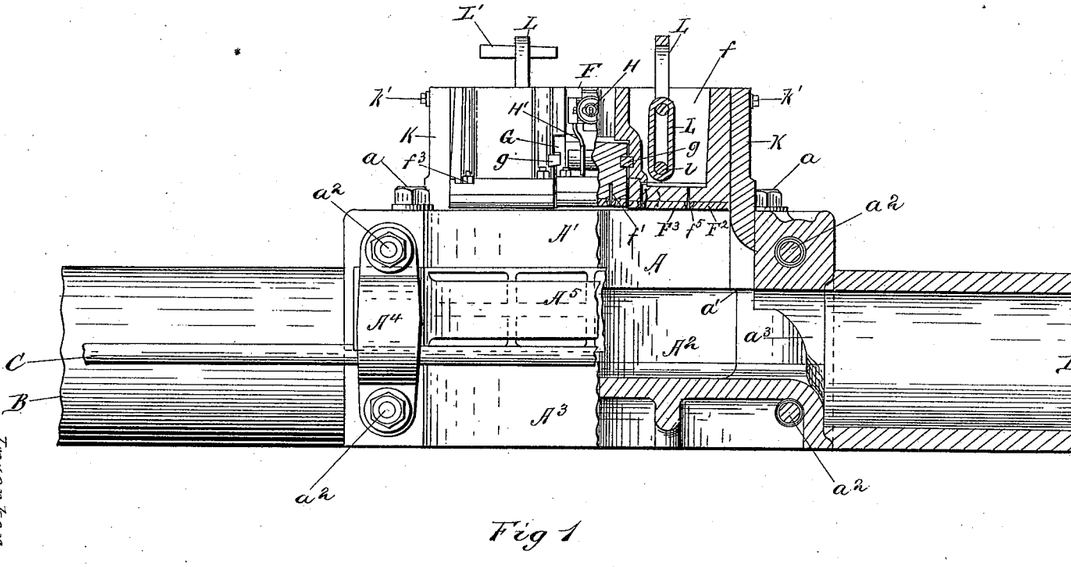
Figure 1 is a side elevation, one half in section, of an apparatus embodying my invention.
Figure 2:
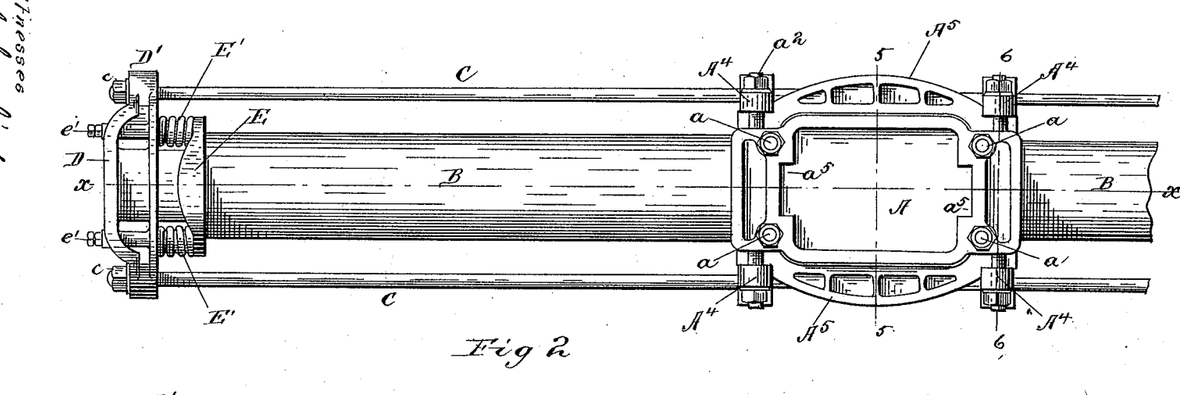
Fig. 2, a plan view of the mold with the plunger removed.
Figure 3:
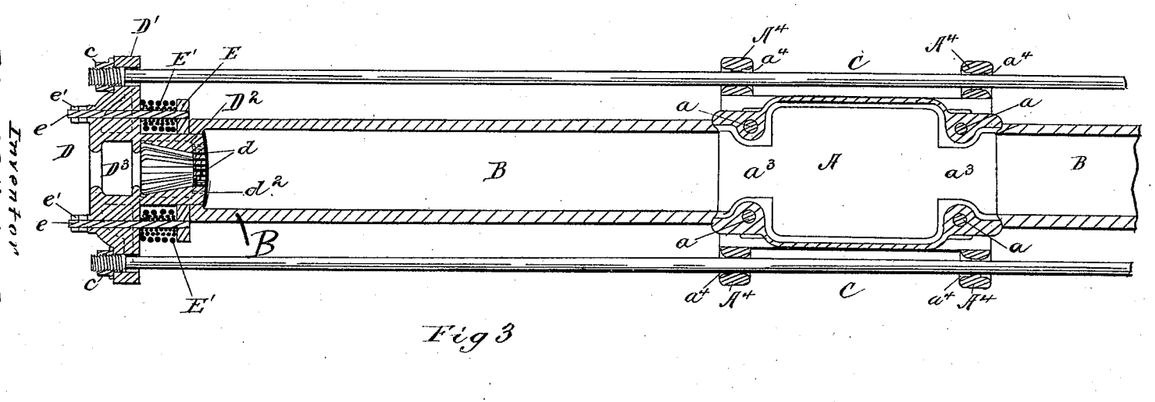
Fig. 3, a plan section of the same.
Figure 4:
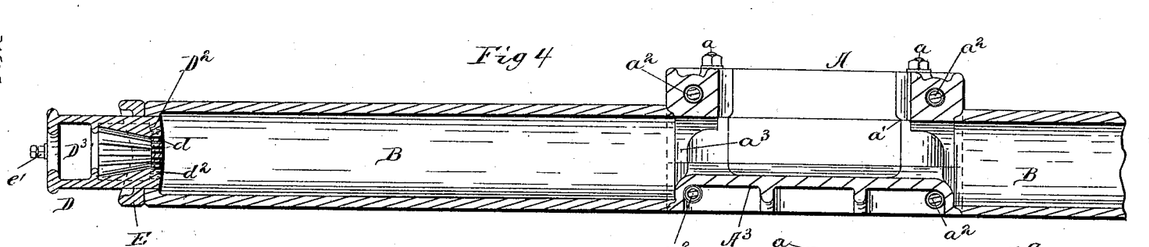
Fig. 4, a longitudinal vertical section of the same on the line $x\ x$ of Fig. 2.

In order to sever the ingots in the branch or side molds from the ingot in the central mold, I employ, as in my application hereinbefore specified, knives K, attached to the ends of the plunger; but these knives operate alone in the present instance, and not in conjunction with corresponding knives projecting upward from the bottom of the mold, as in my other application. These knives, being in actual contact with the molten metal at their lower portions, are as liable to superheat as is the bottom face of the plunger, and in order to enable me to renew these knives as well as the bottom of the plunger, I attach them in such a manner that they are readily removable, so that other knives may be substituted. This I have accomplished in the present instance by means of bolts $k$, which pass through the body of the plunger and through the knives, and receive the nuts $k'$ on their projecting ends, which clamp the knives against the ends of the plunger. It will be observed that these knives project out to an extent equal to their entire thickness beyond the body proper of the plunger, and a corresponding recess or groove, $a^5$, is formed at each end of the central mold to receive the knives, as clearly shown in Fig. 2 of the drawings.

The plunger F may be attached to the press-follower, by means of which it is operated, in any suitable manner. In the present instance I have shown as the means employed to effect this result, a set of links, L, arranged on each side of the plunger, and secured thereto by means of pins $l$, two links being shown in the present instance as composing each set. The upper link passes through the bed of the press-follower, and projects above the same sufficiently to allow the insertion of a wedge, $L'$, which rests upon the upper surface of the bed of the follower, as indicated in dotted lines in Fig. 9 of the drawings, and when driven home the wedges $L'$ draw the plunger tightly up against the follower. The recesses in the plunger may be filled, if desired, with ground silicon or other porous refractory material, and the press follower will be provided with suitable apertures to allow the escape of the gas after it has passed through the recesses in the plunger.

The operation of my apparatus will be readily understood from the preceding description. The pawl $h$, being in the position shown in Fig. 14 of the drawings, may be readily reversed, as hereinbefore described, so that by vibrating the hand-lever H, the movable section G of the plunger will be drawn outward into the position shown in Fig. 10 of the drawings. While in this position the metal may be readily poured through the opening left by the withdrawal of the part G to fill the central mold, A, and the branch molds B. When these molds are properly filled, the movable section G of the plunger is returned to its position and the press operated to cause the plunger to descend within the central mold, thereby compressing the metal in that mold and in the branch molds. As the branch molds become heated and expand, the springs $E'$, by reason of their elasticity, allow this expansion to occur without any undue strain upon the bolts C, which connect the caps of the branch molds. The gases in the molten metal will pass out through the plunger in the central mold and through the vent-apertures in the end caps of the branch molds, as hereinbefore pointed out, and the ingots thus produced will be dense, owing to the pressure to which they have been subjected, and homogeneous, owing to the provision made for the escape of the gases, which would otherwise be retained within their cores. The metal in the central mold has a tendency to chill against the side walls of the mold, thereby producing a tough skin near the walls, which would resist the advance of the plunger into the mold, and it is to provide against this resistance that I form the upper portion of the mold of a less width, whereby the plunger acts only against the central portion of the metal in the mold, and not against that portion near the edges thereof. When the pressing is completed, the ingots are removed in the same manner as in my application hereinbefore pointed out. The area or stroke of the plunger is made proportionate to the volume of metal poured at each heat, so that the pressure may properly reduce the volume of the metal—say eight volumes into seven for Bessemer steel, or ten volumes into eight for crucible steel. When the face of the plunger and the knives become superheated, they can readily be removed and others substituted by detaching the bolts which secure them to the plunger, thereby obviating the necessity of using a new plunger when these parts become too "rotten" for further use.

Figure 20:
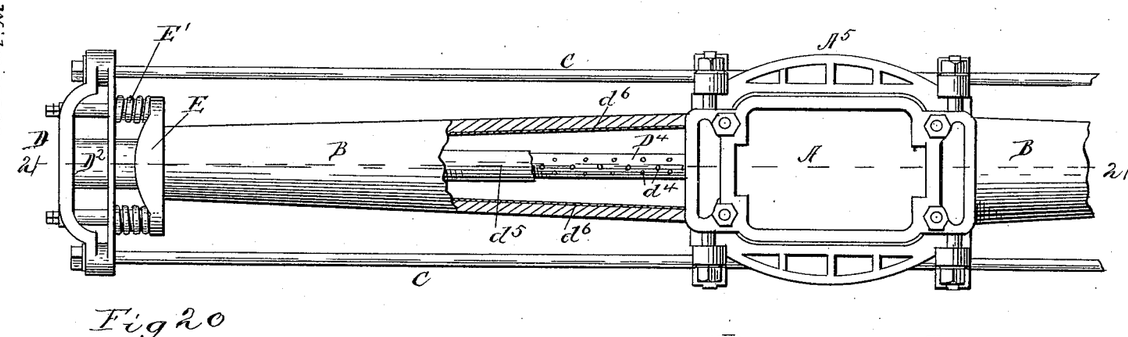
Fig. 20, a plan view, partly broken away, of a modified form of my invention.
Figure 21:
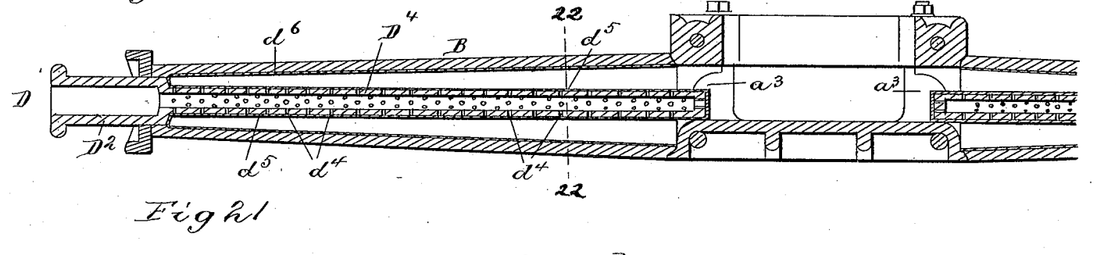
Fig. 21, a sectional view of the same on the line 21 21 of Fig. 20, and Fig. 22 a sectional view on the line 22 22 of Fig. 21.
Figure 22:
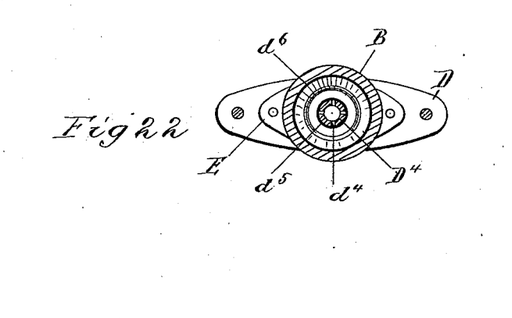

In the construction set forth in the preceding description I have shown and described my invention as embodied in an apparatus consisting of two molds for producing cylindrical ingots with a plate ingot-mold arranged between the two and under the plunger; but it is obvious that a single branch mold only may be used, or that almost any special set of castings within certain limits can be produced by the use of molds of the proper form and construction. In Figs. 20, 21, and 22, for instance, I have shown a set of molds adapted to the production of guns of the breech-loading type. In this construction the molds will of course be given the form and dimensions which it is desired to impart to the body of the gun, they being shown tapering in the present instance, and will be supported in the same manner as the cylindrical molds, as hereinbefore described. The body portion $D^2$ of each cap D will be extended inward, as shown at $D^4$, along the whole length of the axis of the mold to which the cap is attached, extending as far as the central mold and resting upon a suitable support therein, the support in the present instance being shown as consisting of the bottom portion or floor of the passage $a^3$. This extension $D^4$ forms a core to produce the bore of the gun, and is in the shape of a hollow cylinder provided along the whole of its length with numerous minute vent-apertures $d^4$, by means of which the gas in the fluid metal may escape into the hollow center of the core, and thence out at the end of the cap in an obvious manner. This core or extension will also be provided with an external covering, $d^5$, of asbestus cloth, attached thereto in any suitable manner, preferably by winding it on spirally. This will prevent the metal which is in contact with the core from chilling, and thereby forming a skin which will prevent the escape of the gases. A similar covering, $d^6$, of asbestus cloth is applied to the interior surface of the mold. In castings of ordinary ingots, which may be taken from the mold to the regenerating-furnace, such a lining for the mold is unnecessary; but in casting steel guns where extreme hardness of certain parts of the gun is the great requisite, which hardness would be destroyed or greatly reduced by the regenerating-furnace, it is necessary to dispense with the use of the furnace, and in order to accomplish this it is desirable to allow the casting to cool to a certain extent in the mold itself, since otherwise the outer surface would crack in cooling. This is rendered possible by the use of an asbestus lining for the mold, which I therefore employ for the purpose of making these and similar castings.

It is obvious that various mechanical modifications in the details of construction and in the arrangement of the parts may be made without departing from the principle of my invention, and I therefore do not wish to be understood as limiting myself strictly to the precise details of construction hereinbefore set forth, and shown in the drawings.

In my prior application hereinbefore specified I have claimed the general arrangement of the mold and plungers which is common to both that application and this, and I therefore make no claim in the present application to that arrangement, nor do I wish to be understood as claiming in the present application anything claimed in the said application.

Having thus described my invention, what I claim as new, and desire to secure by Letters Patent, is—

1. The combination, with a mold constructed of superposed sections, of bolts passing vertically through the said sections, and vertical tie-pieces at the sides of the mold, secured by transverse bolts passing through the said tie-pieces and through the upper and lower sections, substantially as and for the purposes specified.

2. The combination, with a mold composed of superposed sections, of vertical bolts passing through the said sections, vertical tie-pieces arranged on the sides of the mold and secured by through-bolts, as described, and horizontal tie-pieces having their ends clamped between the vertical tie-pieces and the mold, substantially as and for the purposes specified.

3. The combination, with the branch molds and their caps, of springs arranged between the said caps and the ends of the molds, to permit expansion of the molds, substantially as and for the purposes specified.

4. The combination, with the mold B and cap D, having a body portion, $D^2$, entering the end of the said mold, and a head portion, D', of springs E', arranged between the said cross-head and head portion D', substantially as and for the purposes specified.

5. The combination, with the mold B and cap D, having head portion D' and body portion $D^2$, of the cross-head E, having guide-rods $e$, passing through the head D', and springs E', surrounding the said guide-rods between the head and cross-head, substantially as and for the purposes specified.

6. The combination, with the molds B, of the caps D, connecting-bolts C, having nuts $c$, cross-heads E, having guide rods $e$, provided with nuts $e'$, and springs E', substantially as and for the purposes specified.

7. The combination, with the mold, of a plunger arranged to operate therein to condense the metal, the said plunger being provided with vent-apertures to permit the escape of the gases through the plunger, and a facing of asbetus cloth to prevent the metal from chilling near the vented face, substantially as and for the purposes specified.

8. The combination, with the central mold and a plunger operating therein, provided with vent-passages to permit the escape of the gas, of branch molds communicating with the central mold, and provided with vent-passages at their outer ends, substantially as and for the purposes specified.

9. The combination, with the molds B, of the caps D, having vent-apertures $d$, grooves $d'$, and asbestus-cloth facing $d^2$, substantially as and for the purposes specified.

10. The combination, with the central mold, A, and branch molds B, communicating therewith, of a plunger operating in the central mold, and provided with knives K, to sever the ingots in the branch molds from the ingot in the central mold, substantially as and for the purposes specified.

11. The combination, with the plunger F, of the knives K, detachably secured thereto, substantially as and for the purposes specified.

12. The combination, with the plunger F, provided on its bottom face with a series of holes or perforations, of bushings of fire-clay or other refractory material secured within said holes and provided with vent-apertures, substantially as and for the purposes specified.

13. The combination, with the plunger F, having vent-passages $f'$, of the false bottom $F^2$, having coned holes $f^4$, and fire-clay bushings $f^5$, provided with vent-passages communicating with the passages $f'$, substantially as and for the purposes specified.

14. The combination, with the mold A, of a plunger operating therein, and having a movable section which may be displaced to form a pouring-orifice, substantially as and for the purposes specified.

15. The combination, with the plunger F, of the movable section G, sliding on suitable ways, $g$, and means for operating said movable section, substantially as and for the purposes specified.

16. The combination, with the plunger F, of the movable section G, link G', lever $G^2$, provided with ratchet-teeth $G^3$, and a hand-lever, H, provided with a pawl engaging the said ratchet-teeth to operate the movable section, substantially as and for the purposes specified.

17. The combination, with the lever G² and the mechanism operated thereby, the said lever being provided with the reversely-arranged sets of ratchet-teeth G³, of the hand-lever H, provided with a double pawl, h, and the spring I, mounted in the lever H, and capable of being rotated therein to cause the said pawl to engage with either of the said sets of ratchet-teeth, substantially as and for the purposes specified.

18. The combination, with the plunger F, having movable section G, the link G', and the lever G², provided with ratchet-teeth G³, of the hand-lever H, reversible pawl h, revoluble sleeve I', provided with spring I, and the wrench-grasp i', arranged within the hollow end of the hand-lever, substantially as and for the purposes specified.

19. The combination, with the plunger F, having movable section G, the link G', and lever G², provided with ratchet-teeth G³, of the lever H, having pawl h, and reversing-spring I, connected with the wrench-grasp i', arranged within the hollow end of the hand-lever, the groove j' and slot j³, formed within the interior wall of the said hollow end, and a wrench, J, adapted to fit upon the wrench-grasp i', and provided with a pin, j, to engage the groove j', substantially as and for the purposes specified.

20. The combination, with the central mold and one or more branch molds connected therewith and lined with asbestus cloth, of a hollow core arranged centrally in each branch mold, and provided with vent-passages and an asbestus-cloth covering, substantially as and for the purposes specified.

EDWARD B. MEATYARD.

Witnesses:
IRVINE MILLER,
JNO. C. MACGREGOR.